United States Patent Office 2,714,895
Patented Aug. 9, 1955

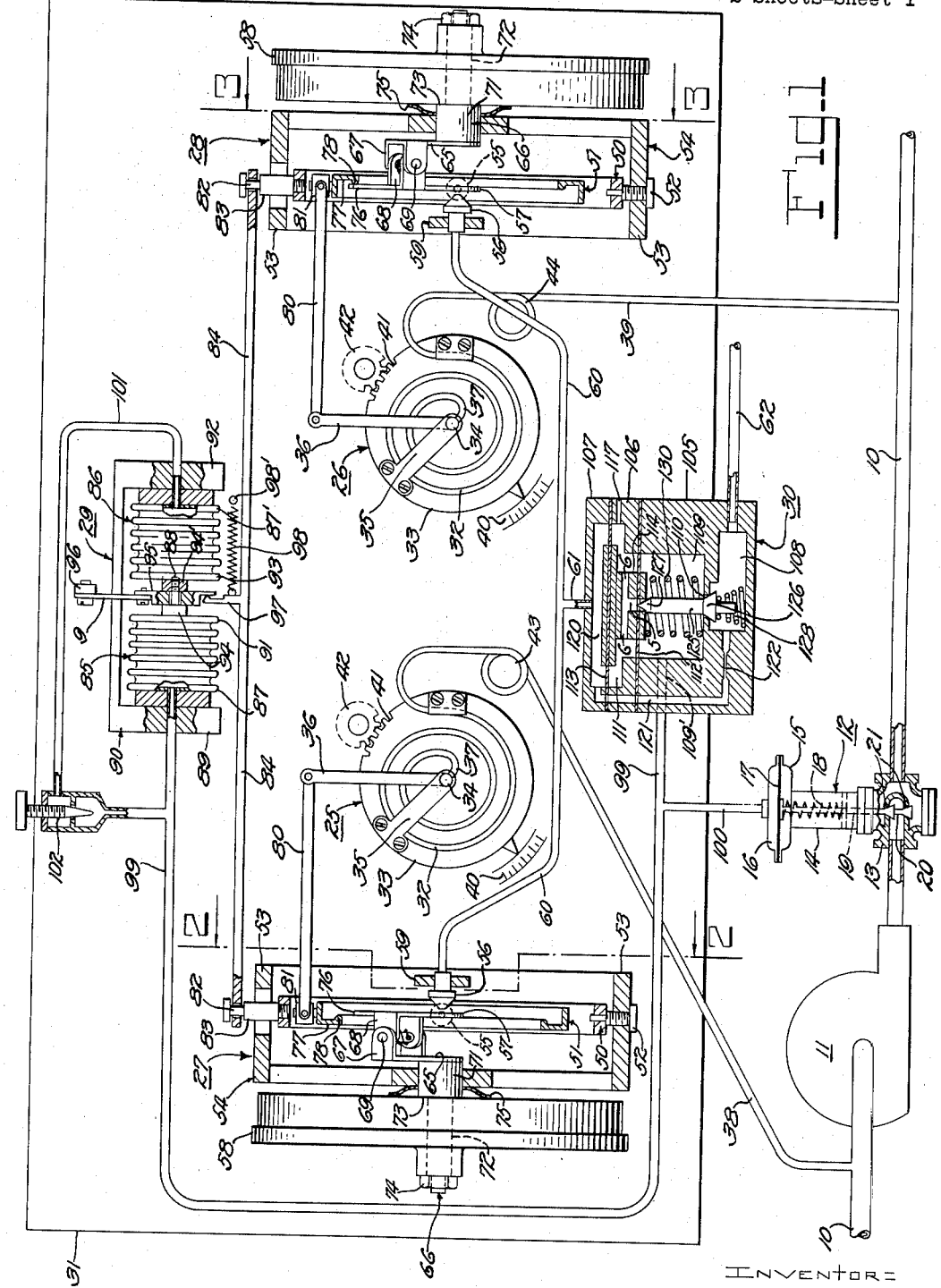

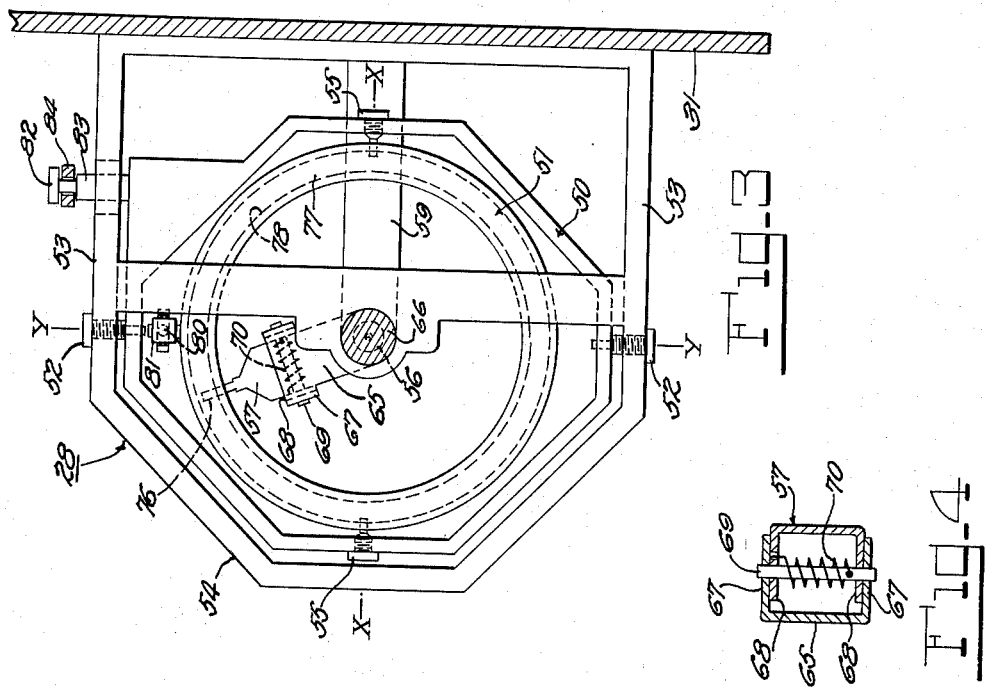
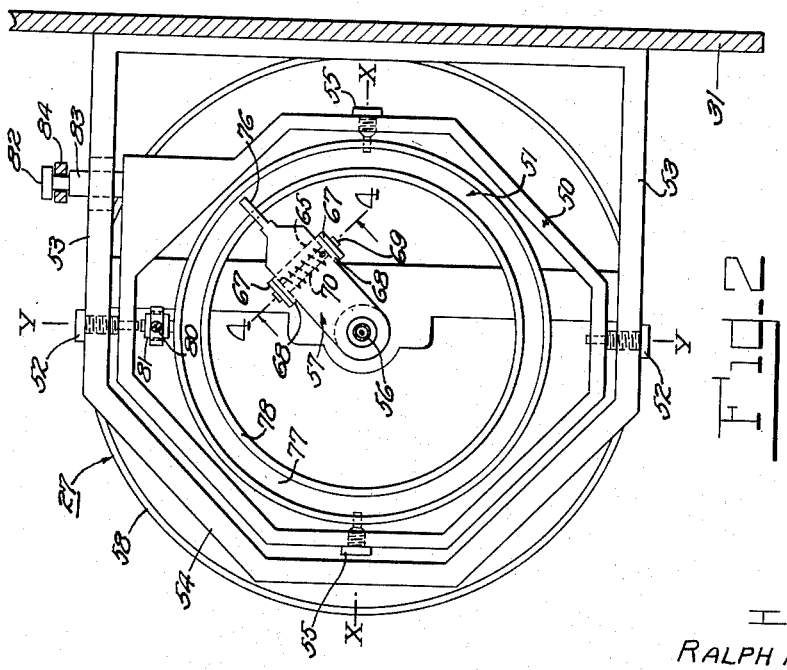

2,714,895

PNEUMATIC CONTROL MECHANISM FOR MUTUALLY DEPENDENT VARIABLES

Ralph A. Rockwell, Hingham, Mass., assignor to Mason-Neilan Regulator Company, Boston, Mass., a voluntary association of Massachusetts Application April 23, 1952, Serial No. 283,875

7 Claims. (Cl. 137—86)

This invention relates particularly to the control of pipe line booster station pumps wherein it is desirable to maintain the pump suction pressure at or above a predetermined value, and when the suction pressure is at or above the said value, to maintain the discharge at a pressure which does not exceed a second selected value. And it will be understood that while the apparatus embodying this invention is herein shown and described as applied to the control of pipe line booster stations, it may be equally well utilized in connection with the control of a plurality of variables of any form wherein similar control conditions are encountered. More particularly the invention relates to pneumatically operated control means for effecting the object hereinabove set forth with a view to simplifying the control equipment heretofore in use, so far as known to me, and at the same time to provide a suitable and dependable control means of inexpensive construction for the purpose.

In the control of pipe line booster stations it has been customary to employ two pneumatically operated controllers for actuating a valve governing the volume of fluid discharged from the station by one or more booster pumps as required to maintain pump suction pressure at or above a selected value, and if this condition is met, to maintain the station discharge pressure at not exceeding a selected value. For this purpose one controller is responsive to changes in pump suction pressure and the other controller to changes in station discharge pressure, the suction controller governing the valve when the suction pressure tends to fall below a selected suction pressure and the discharge controller governing the same valve when the discharge pressure tends to exceed a selected discharge pressure.

In one form of control two proportioning controllers are arranged in series each including a primary response element, a proportioning element, a nozzle and flapper actuated by the aforesaid elements, and a pilot valve. The output pressure from the pilot of the suction controller supplies the pilot of the discharge controller, and the suction controller is arranged to close its nozzle and suppply maximum operating pressure to the pilot of the discharge controller when the suction pressure exceeds a selected value. The output pressure from the pilot of the discharge controller actuates the valve governing the quantity discharge of fluid from the station, and the discharge controller is arranged to close its nozzle when the discharge pressure is below a selected value. Thus in one type of pump installation wherein one or more constant speed centrifugal pumps are employed, an air-to-open valve may be utilized to throttle the pump discharge. Therefore when the suction pressure tends to fall below the set value, the suction controller reduces its output pressure to the discharge controller pilot and thence to the valve to throttle the pump discharge and thereby maintain the suction pressure at the set value. On the other hand, when the suction pressure is above the set value and the station discharge pressure tends to exceed its set value, the existing output pressure supplied by the suction controller is reduced by the discharge controller to throttle the pump discharge and prevent the station discharge pressure from exceeding the set value. Thus in the operation of the system the control is automatically switched from one controller to the other, and the controller that establishes the lower output pressure governs the valve opening.

This control arrangement is suitable for any type of valve action and any type of pumping device so long as the reduction of output pressure to the valve reduces the flow through the system.

In another form of pneumatic control apparatus, wherein proportioning-reset control is provided, two control units are employed which function together with one pilot valve to vary the operating pressure to a valve for effecting the purpose outlined above, one unit being responsive to pump suction pressure and the other unit to station discharge pressure. Each of said units includes a primary response device, a proportioning-reset device, and a nozzle and flapper jointly actuated by the aforesaid devices, both of the proportioning-reset devices being responsive to the pilot valve output pressure.

In connection with the control of booster station pumps, it may be desirable to provide both the suction and discharge controllers with proportional-reset control response in order to prevent drift from the control point setting resulting from a change in load. It has been found impracticable to include the reset function in the first controller when two separate controllers are used in series, since when the second instrument is in control, the first instrument reset pressure equalizes at the supply pressure, shifting the proportioning band beyond the index setting which results in discontinuity when the first instrument attempts to re-establish control. Thus when a change in operating condition occurs necessitating the first instrument to come into operation, it does so with its control point established at a value substantially below the index setting. This displacement of the proportioning band results in an appreciable deviation of the control pressure which due to the operating conditions may result in shut down.

I have found that unless there is a bottleneck at some outbound booster station, all stations normally operate on suction control. When the suction pressure is held constant, the control system adjusts the booster station pumping capacity to correspond to the incoming flow. If the flow entering a station increases the suction pressure tends to increase and therefore the suction controller varies the valve opening to increase proportionally the station output. And since changes in station input are matched by changes in station output, and the suction and discharge controllers operate on the same process loop actuating the same control valve, the control response whether on suction or discharge should be the same to provide for the optimum performance. As is well known to those skilled in the art in any given proportioning-reset system the reset rate is substantially directly proportional ot the flow capacity $C_v$ of the resistance unit and to the pressure differential between the proportioning bellows and the reset bellows. And I have found that one rate of reset adjustment is all that is required provided the proportioning band settings are approximately correct.

In the control of pipe line booster stations, the measuring element responsive to suction pressure usually has a range of 200 or 300 p. s. i. and the element responsive to discharge pressure may have a range of 1,000 to 1,500 p. s. i., and I have found that the proportioning band of each element should be the same in terms of line pressure p. s. i., or in terms of percentage, should be inversely proportional to the range. Thus if a suction pressure element having a range of 200 p. s. i. is provided with a 40% proportioning band, a discharge pressure element having a range of 1,000 p. s. i. requires an 8% proportioning band. Therefore the controller embodying my invention combines a common feedback motion to both the suction and discharge mechanism with independent proportioning band adjustments.

It is an object of this invention to provide means for controlling pipe line booster stations, or a plurality of variables of any kind wherein similar conditions are encountered, in the form of a pneumatically operated controller which provides the required control responses combined with simplicity of mechanical construction and ease of field adjustment.

It is an object of this invention to provide means for effecting the control referred to above wherein the working parts are materially reduced and may be readily installed in one instrument case of standard size with ample room for the purpose.

These and other objects of this invention will be apparent from the following description when taken in connection with the accompanying drawings in which—

Fig. 1 is a front elevation, partly in diagram and partly in section, of a controller embodying the present invention as applied to a constant speed centrifugal pump for governing a valve to maintain selected suction and output pressures in a pipe line;

Figs. 2 and 3 are vertical sections taken, respectively, on the lines 2—2 and 3—3 of Fig. 1; and Fig. 4 is a structural detail view in section taken on the line 4—4 of Fig. 2.

Having reference to the drawings, there is shown a control mechanism embodying this invention utilized for controlling the flow of liquid, such as gasoline, fuel oil and the like, through a pipe line 10. The pipe line 10 includes a pump 11, herein shown as being of the constant speed centrifugal type, and a valve 12 of usual construction. The valve 12 includes a body 13, an intermediate 14, and a fluid pressure operating motor 15 which consists of a fluid pressure chamber 16, one wall of which is defined by a diaphragm 17 backed by a spring 18. A stem 19 serves to connect the diaphragm 17 with a double seated valve member 20 which cooperates with ports 21 in the usual manner for varying fluid flow through the valve, the parts being arranged so that the valve opens under an increase of fluid pressure in the diaphragm chamber 16.

The control mechanism embodying this invention governs the valve 12 to maintain the suction pressure at or above a selected value, and if this condition is met, to maintain the discharge pressure at not exceeding a selected value. For this purpose the control mechanism includes two spiral coil assemblies, generally indicated at 25 and 26, two proportioning hand adjustment assemblies, generally indicated at 27 and 28, each of which cooperates with a common proportioning-reset device 29, and a pilot valve 30. The pilot valve and the aforesaid assemblies may be mounted on the usual back plate shown at 31, which in turn is adapted to be mounted in a recording or indicating instrument case of standard size such as is commonly employed for housing various standard forms of control mechanism.

The coil assemblies 25 and 26 are generally similar in construction, and in order to simplify this description, each is herein illustrated as including a spiral tubular coil 32, but it will be understood that any well known arrangement suitable to the purpose may be employed. The spiral coil 32 is mounted with one end secured to a circular plate 33 which in turn is rotatably mounted on the back plate 31. The coil 32 is provided with a central shaft 34 journalled in the plate 33 at its inner end and at its outer end in an arm 35 rigidly attached to the circular plate. A motion transmitting arm 36, secured to the shaft 34, is in operative connection with the free end 37 of the coil. The fixed end of the coil 32 in the assembly 25 communicates with a tube 38 which serves to connect the coil with the pipe line 10 at the suction side of the pump 11. On the other hand the fixed end of the spiral coil 32 in the assembly 26 communicates with a tube 39 which serves to connect the coil with the pipe line 10 downstream of the valve 12. The parts are so arranged that on an increase in pressure, the coil 32 of each assembly unwinds and rotates the arm 36 counterclockwise as viewed in Fig. 1, and on a decrease in pressure, the opposite occurs.

The rotatable circular plate 33 of each assembly provides means whereby a selected control setting may be obtained on a suitable scale 40, and for this purpose the plate is provided at its periphery with a toothed section 41 which cooperates with a hand operated gear 42, tubes 38 and 39 being provided with flexible portions 43 and 44, respectively, to permit the coil to be rotated by the gear to any selected position within the range of control setting adjustment. As will appear from the following description, the arrangement of parts shown in the drawings is such that when the plate 33 in the assembly 25 is rotated clockwise, the suction pressure setting is raised. On the other hand when the plate 33 of the assembly 26 is rotated clockwise, the station discharge pressure setting is lowered. And it will be understood that when the plates are rotated counterclockwise, the opposite occurs.

The proportioning band adjustment assemblies 27 and 28 are similar in construction and are preferably of the gimbal type shown and described in Letters Patent of the United States to J. W. Robins #2,585,347, granted February 12, 1952. Each of these assemblies comprises interacting outer and inner gimbals 50 and 51, respectively. The outer gimbal 50, which is herein shown as in the general shape of an octagon but which may be in any other suitable form, is arranged to rotate about a pivotal axis Y—Y (Figs. 2 and 3) and for this purpose is pivotally mounted at two opposite sides on pivot screws 52 threaded into the rearwardly extending legs 53 of a supporting bracket 54 which is attached to the back plate 31. The inner gimbal 51, preferably in the form of a ring, is pivoted at opposite sides of the outer gimbal by means of screw pivots 55 threaded into the outer gimbal as shown to provide a pivotal axis X—X. It will be noted that the parts are so arranged that the pivotal axis X—X of the inner gimbal is normal to and bisects the pivotal axis Y—Y of the outer gimbal. Thus the gimbals of each assembly are free to rotate independently about their individual axes, and in order to effect such independent rotation in response to changes in controller output pressure occasioned by changes in pipe line pressure, the parts are preferably arranged so that each inner gimbal 51 is rotated by its associated coil 32 and each outer gimbal 50 is rotated by the proportioning-reset device 29 in a manner to be described. And it may be herein pointed out that while it is preferable that the gimbal axes be normal to and bisect each other, it is not essential to the operation of the devices for they will function provided the axes intersect within the gimbals at any workable angle.

Each gimbal assembly also includes a nozzle 56, a cooperating flapper 57, and a handwheel 58 for varying the width of the proportioning band and for determining the direction of controller output pressure change occasioned by a change in pipe line pressure. Each nozzle 56 is mounted on a support 59 secured to the bracket 54 with its nozzle orifice axis preferably in coincidence with the axis of the handwheel 58 and preferably disposed substantially in a plane defined by both gimbals when the plane of one gimbal is in coincidence with that of the other. The nozzles 56 are connected by a common pipe 60 which in turn communicates by means of a pipe 61 with the pilot valve 30, to be described, having a suitable supply of regulated fluid operating pressure received through a pipe 62 from a source not shown.

Each flapper 57 is pivotally mounted on an arm 65 rigidly secured to the inner end of a shaft 66 to which the handwheel 58 is also secured. The shaft 66 is rotatably mounted in the gimbal supporting bracket 54, as shown, with its axis normal to the axes X—X and Y—Y of the gimbal system when the planes of the gimbals are in coincidence, the axis of said shaft preferably passing through their point of intersection. The free end of the arm 65 is provided with spaced lips 67 between which two spaced ears 68 of the flapper 57 are received (see Fig. 4) and pivotally mounted on a pin 69 secured to the ears 67. The flapper is resiliently urged about its pivot against the orifice of the nozzle by means of a coil spring 70 which surrounds the pin 69 between the ears 68, one of the ears being pierced to receive one end of the spring and the pin being pierced at a point adjacent the opposite ear to receive the other end of the spring. The handwheel shaft 66 is provided with an enlarged inner end 71 to which the flapper arm 65 is secured, and is also provided with a reduced outer end 72 forming a shoulder 73 against which the wheel 58 is held by a nut 74. A cup-shaped friction washer 75 is compressed by the nut 74 between the frame 54 and the adjacent face of the wheel 58 and serves as means for restraining the shaft against axial movement and for holding the wheel at the rotary adjustment selected. Means for positioning the flapper 57 in respect to the orifice of the nozzle 56 is provided by the inner gimbal 51 which engages an extension 76 on the outer end of the flapper and functions to vary the position of the flapper in respect to the nozzle on a basis which is the resultant of the combined rotary movements of the gimbals. For this purpose the gimbal 51 has an annular inwardly extending flange 77 having a laterally extending lip 78 which is engaged by the flapper extension 76, that portion of the lip which is engaged by the extension being in a plane which is in substantial coincidence with the gimbal axes X—X and Y—Y when the gimbals are disposed in the same plane.

In accordance with my invention the inner gimbal 51 of each gimbal assembly is actuated independently about its axis X—X by its associated coil 32 in response to changes in pipe line pressure, whereas the outer gimbal 50 of one gimbal assembly is actuated in common with the outer gimbal 50 of the other gimbal assembly in response to changes in controller output pressure by means of the proportioning-reset device 29. For this purpose the coil arm 36 of the coil assembly 25 is pivotally connected at its free end with a link 80 which in turn has a connection 81, in the form of a universal joint, with the inner gimbal 51 of the gimbal assembly 27. In the same way the coil arm 36 of the coil assembly 26 has a similar connection with the inner gimbal 51 of the gimbal assembly 28 by means of a link 80. Thus the inner gimbal in the assembly 27 is positioned about its axis X—X in proportional relation to changes in pump suction pressure, whereas the inner gimbal of the assembly 28 is positioned about its axis X—X in proportional relation to changes in station discharge pressure. On the other hand the outer gimbals 50 of each assembly have a pivotal connection 82 in an extension portion 83 with a common link 84 to which a substantially reciprocal movement is imparted by the proportioning-reset device now to be described.

The proportioning-reset device 29 comprises a proportioning bellows 85 and a reset bellows 86, the former being secured at its fixed end 87, to one arm 89 of a supporting bracket 90 which in turn is rigidly secured to the back plate 31, and the latter being connected at its fixed end 87¹ to the other arm 92 of the bracket. The free end of each bellows 85 and 86 is provided with end plates 91 and 93, respectively, having bosses 94 and 94¹, respectively. The boss 94 is provided with an extension 88 which projects freely through a leaf spring plate 95 and is threaded into the boss 94¹ to rigidly clamp the leaf spring plate to the bellows as shown in Fig. 1. A leaf spring 9 which tends to maintain the bellows at a median position is rigidly attached at one end to the leaf spring plate 95 and at the other end to a stationary bracket 96.

The connecting link 84 is in operative connection with the leaf spring plate 95 by means of an arm 97 rigidly connected to the link and maintained in contact with the plate 95 by a tension spring 98 secured at one end to the arm and at the other end to a fixed stud 98¹. The proportioning bellows 85 is connected with a pipe 99 communicating with the output pressure from the pilot 30, to be described, to which pipe the chamber 16 of the valve 12 is also connected by means of a pipe 100. The reset bellows 86 is likewise connected with the pipe 99 by means of a tube 101 containing an adjustable restriction 102 which may be of any well known construction. It will be understood that the combined actions of the proportioning and reset bellows in response to changes in pilot output pressure function to position the outer gimbals of each assembly 27 and 28 in proportional relation to changes in pilot output pressure as will be more fully set forth in describing the operation of the device.

The pilot valve 30 may be of any usual construction and as herein shown includes a body 105 mounted on the back plate 31, an intermediate plate 106 mounted on the body, and a cover plate 107 mounted on the intermediate plate. The body 105 is provided with an inlet chamber 108 and an output pressure chamber 109 connected with the inlet chamber by means of a port 110 and with the pipe 99 by means of a passage 109¹ in the body. The output pressure chamber 109 communicates with an exhaust chamber 111 within the intermediate plate 106, one wall of which chamber is defined by a diaphragm 112 the periphery of which is clamped between the intermediate plate 106 and the body 105 and the other wall of which is defined by a diaphragm 113 clamped at its periphery between the intermediate plate and the cover plate 107. Disposed between the diaphragms 112 and 113 is a block 114 which functions both as a spacer and as a waste valve member for which latter purpose the block is provided with an axially disposed port 5 which communicates with transverse ports 6 and thence with the atmosphere through the chamber 111 and an exhaust port 117 in the intermediate plate 106. The diaphragm 113 also defines one wall of a nozzle pressure chamber 120 which connects with the supply chamber 108 through a passage 121 having a restriction 122 and also connects with the common nozzle pipe 60 through the pipe 61 heretofore referred to. It will be understood that the capacity of the restriction 122 is less than that of each nozzle 56 so that the fluid pressure in the nozzle pressure chamber 120 is governed by the relative position of the flapper 57 in respect to the nozzle 56 in the gimbal assembly 27 or by the nozzle and flapper in the gimbal assembly 28, depending on which flapper is positioned to provide the lower pressure.

Means which function with the diaphragms 112 and 113, providing changes in output pressure in proportional relation to changes in nozzle pressure, is in the form of a supply and waste valve member 125 having an inlet valve 126 cooperating with the port 110 and an outlet valve 127 cooperating with the port 5 in the combined spacer and valve member. A compression spring 128, disposed in the supply chamber 108 beneath the valve member 125, normally closes the supply port and a compression spring 130, disposed in the output pressure chamber 109 around the valve member 125, together with the diaphragm 112 opposes the pressure in the nozzle pressure chamber 120 as reflected by the diaphragm 113. It will be noted that the diaphragm 113 which is responsive to changes in nozzle pressure, is considerably larger than the diaphragm 112 which is responsive to changes in output chamber pressure, and in actual practice it has been customary to arrange the parts so that a change in nozzle pressure from 6½ p. s. i. to 10 p. s. i. provides a change in output pressure from 0 p. s. i. to 15 p. s. i. It will be noted also that an increase in pressure in the chamber 120 opens the supply valve and provides a proportional increase in pressure in the output pressure chamber 109. On the other hand a decrease in pressure in the chamber 120 opens the waste valve until a proportional decrease in pressure occurs in the output pressure chamber 109.

Disregarding the reset action provided by the bellows 86 and referring to the gimbal assembly 27 and associated coil assembly 25, and assuming that the station discharge pressure is below its set value so that the nozzle 56 in the gimbal assembly 28 is closed, an increase in suction pressure above the index setting rotates the arm 36 counterclockwise, thereby rotating the inner gimbal 51 counterclockwise as viewed in Fig. 1. When the flapper 57 is adjusted by the handwheel 58 so that it is engaged by the inner gimbal 51 in the upper righthand quadrant as viewed in Fig. 2, the counterclockwise movement of the inner gimbal permits the flapper spring 70 to move the flapper towards the nozzle 56. The resulting increase in nozzle pressure provided by the flapper in assembly 27 produces an increase in pilot valve output pressure which causes the proportioning bellows 85 to expand, thereby rotating the outer gimbal 50 about its axis Y—Y in a direction to cause the inner gimbal 51 to move the flapper away from the nozzle and restore the flapper to a throttling relation therewith at an increase in output pressure which increase is proportional to the increase in suction pressure. And when the suction pressure increases above the set value and exceeds the range of pressure change provided by the proportioning band setting, the flapper engages the nozzle and a maximum output pressure is obtained. On the other hand when the suction pressure decreases below the set value, a proportional decrease in output pressure occurs. The width of the proportioning band setting depends on the position to which the flapper is adjusted within the gimbal quadrant. As the flapper extension 76 is rotated towards the gimbal axis X—X the width of the proportioning band is increased and vice versa so that any desired width of proportioning band may be readily obtained by the adjustment wheel 58.

Again disregarding the reset action for the moment and referring now to the coil assembly 26 and its associated gimbal assembly 28, and assuming that the suction pressure is above its set value so that the nozzle in gimbal assembly 27 is closed, an increase in station discharge pressure above the set value causes the coil 32 to rotate the arm 36 counterclockwise, thereby rotating the inner gimbal 51 counter-clockwise about its axis X—X as viewed in Fig. 1. When the flapper is adjusted to the quadrant position shown in Fig. 3, the flapper is moved away from the nozzle providing a decrease in output pressure which immediately causes the bellows 85 to contract, thereby turning the outer gimbal 50 in a direction to return the flapper towards the nozzle and provide a throttling relation therewith at a lower pressure which is proportional to the increase in station discharge pressure. On a decrease in station discharge pressure below the pressure setting, a proportional increase in output pressure is produced, and when the discharge pressure drops below the range of pressure change provided by the proportioning band setting, the flapper engages the nozzle and a maximum output pressure is obtained. The proportioning band adjustment may be accomplished in a manner similar to that described in connection with the gimbal assembly 27. As the flapper extension 76 is rotated towards the gimbal axis X—X, the width of the proportioning band is increased and vice versa.

It will be understood from the above that individual proportioning band adjustments are provided for governing the suction pressure and the discharge pressure; and I regard this as an important feature of my invention for I have found that the proportioning band of each coil 32 should be the same in terms of line pressure, or in terms of percentage should be inversely proportional to the coil range.

Referring now to the common feedback provided by the reset bellows 86, I find, as set forth above, that under normal operation the quantity discharge from the station equals the quantity input. Therefore a change in quantity input is matched by a change in quantity output and the suction control and discharge control operate on the same process loop. Thus, the same reset rate applies to both controls and a stable control may be obtained by a common feedback combined with individual proportioning band adjustments, whereby a suitable reset rate may function with two proportioning bands which are adjusted in the manner just referred to.

It will be understood by those skilled in the art that the reset rate depends on the pressure differential between the proportioning bellows 85 and the reset bellows 86 and in addition depends on the flow capacity provided by the restriction 102. Thus when the suction pressure drops below the set value, an increase in suction pressure causes the coil of assembly 25 to move the flapper of assembly 27 towards the nozzle, whereupon the proportioning bellows 85 expands and returns the flapper to a throttling relation with the nozzle at an increase in output pressure, which increase is proportional to the increase in suction pressure. The increase in output pressure is gradually transmitted to the reset bellows 86 through the restriction 102, thereby tending to move the flapper towards the nozzle to again increase the output pressure. The valve 12 thus gradually assumes a wider opening causing the suction pressure to return towards the index setting and the control system comes to balance with the suction pressure at the control point at which time the pressures obtaining in the bellows 85 and 86 are equal. And it will be understood that the same control actions occur in the combination of the discharge control assemblies and the proportioning-reset device when the station discharge pressure tends to increase above the set value.

It may herein be pointed out that since the feedback to both proportioning gimbal mechanisms is obtained from a common proportioning-reset bellows assembly, when either controlled pressure is at its index setting, the pressure in the reset bellows has equalized with the pressure in the proportioning bellows. Therefore when changes in operating conditions occur, necessitating a switch from one control assembly to the other, since the pressure in the reset bellows prior to the switch over is substantially at the pressure required after the switch has taken place, the pressure change required to bring the parts to the new balance is negligible and is comparable to that of any proportioning-reset controller which governs a single variable when subjected to a change in operating conditions. Thus by the means herein shown and described I am able to govern two mutually dependent variables without any abrupt change in output pressure or in the variable under control when the control is switched from one variable to the other.

In describing the operation of the controller it may be assumed that the spiral coil 32 of the coil assembly 25, which is responsive to changes in suction pressure, has a range from 0 p. s. i. to 200 p. s. i., and that the coil 32 in the coil assembly 26, which is responsive to changes in station discharge pressure, has a range from 0 p. s. i. to 1000 p. s. i. It may also be assumed that the manual control point setting gear 42 in coil assembly 25 is adjusted to maintain a suction pressure of 50 p. s. i., and that the setting gear 42 in the assembly 26 is adjusted to maintain a station discharge pressure of 800 p. s. i. Under these conditions it may be found feasible to provide the coil 32 of the assembly 25, having a 200 p. s. i. range, with a 40% proportioning band, thereby providing for a suction pressure change of 80 p. s. i. to fully stroke the valve 12. And since the coil in the assembly 26 has a 1000 p. s. i. range and the discharge pressure change to fully stroke the valve should be the same as that for the coil in the assembly 25, an 8% proportioning band adjustment or, in terms of discharge pressure, 80 p. s. i. should be provided for the coil in the assembly 26 to fully stroke the valve. It may be assumed further that a petroleum fractionation, such as gasoline, is passing through the pipe line, that the suction pressure is at the 50 p. s. i. setting, that the discharge pressure is below the 800 p. s. i. setting, that the nozzle in the gimbal assembly 28 is closed, and that the output pressure is governed by the coil assembly 25 and gimbal assembly 27 to throttle the valve 12 at an opening which permits the quantity of gasoline being discharged from the station to equal that which comes into it.

Now let it be assumed that the flow of gasoline to the station increases, thereby tending to increase the suction pressure above the setting of 50 p. s. i., the coil 32 of the assembly 25 will rotate counterclockwise as hereinabove described and together with the proportioning-reset device will gradually open the valve 12 until the increase in pipe line input is equalled by the increase in pipe line discharge and the suction pressure is thereby maintained at the 50 p. s. i. setting.

Again let it be assumed that the station input decreases and that the suction pressure starts to drop, the discharge pressure still being below 800 p. s. i. The drop in suction pressure will be responded to by the suction control assemblies 25 and 27 and proportioning-reset device 29 to gradually decrease the output pressure until the valve is throttled at an opening which maintains the suction pressure at the 50 p. s. i. setting. Therefore, as in the previous case, the decrease in station input will be matched by a corresponding decrease in station output. Thus as long as the discharge pressure is below the 800 p. s. i. setting the valve 12 will be governed by the suction control assemblies 25 and 27 in combination with the proportioning-reset device 29.

In the event that the demand in the output line falls below the supply in the input line, the suction pressure will exceed the 50 p. s. i. setting. Therefore the flapper in the gimbal assembly 27 will engage its nozzle to produce a maximum output pressure and provide a maximum opening to the valve 12. The discharge pressure will then tend to exceed the 800 p. s. i. setting. When this occurs, the discharge control assemblies 26 and 28 together with the proportioning-reset device will reduce the output pressure, thereby decreasing the valve opening to prevent the discharge pressure from exceeding 800 p. s. i. And the discharge pressure control assemblies will continue to govern the valve as long as the input supply exceeds the output demand. It will be understood that when the output demand again exceeds the input supply the discharge pressure will again drop below 800 p. s. i., the discharge control will again cause the flapper to engage its nozzle, the suction pressure will tend to drop below the setting of 50 p. s. i., and the suction control will again reduce the output pressure and throttle the valve to maintain the suction pressure at the setting index as hereinabove described.

While I have shown and described a preferred form of mechanism embodying this invention, it will be understood that any well known means for providing individual adjustable proportioning bands combined with a common proportioning-reset device may be employed without departing from the spirit and scope of my invention.

What I claim as new and desire to secure by Letters Patent of the United States is:

1. In apparatus for controlling predetermined limit values in a series of mutually dependent variables by regulating a manipulated variable, a control mechanism having a fluid pressure system and comprising, first and second valves each connected with said system and communicating with a source of fluid pressure for varying the pressure in the system, a first motion transmitting mechanism in operative connection with said first valve, a second motion transmitting mechanism in operative connection with said second valve, a first element responsive to changes in value in a first mutually dependent variable imparting movements to said first motion transmitting mechanism in response to said changes, a second element responsive to changes in value in a second mutually dependent variable imparting movements to said second motion transmitting mechanism in response to said changes, a proportioning-reset device including a first expansible member directly responsive to a pressure change in said system having a movement effective in a selected sense in response to said pressure change, a second expansible member responsive to a pressure change in said system through a restriction and having a movement effective in the opposite sense in response to said pressure change, and a motion responsive member operatively connecting the resultant movement of said expansible members with each motion transmitting mechanism, the resultant movement of said expansible members imparting movements to each motion transmitting mechanism in accordance with a selected reset rate, an independent proportioning band adjustment associated with each of said motion transmitting mechanisms for varying the movements imparted to said first valve and said second valve to provide independent proportioning band settings combined with a common selected reset rate, and regulating means actuated by changes in fluid pressure in the system for varying the value of said manipulated variable.

2. In apparatus having a fluid pressure system for controlling predetermined limit values in a series of mutually dependent variables by regulating a manipulated variable, first and second valves each connected with said system and communicating with a source of fluid pressure for varying the pressure in the system, first and second elements each responsive to changes in value in a mutually dependent variable, a proportioning-reset device including a first expansible member directly responsive to a pressure change in said system having a movement effective in a selected sense in response to said pressure change, a second expansible member responsive to a pressure change in said system through an adjustable restriction and having a movement effective in the opposite sense in response to said pressure change, and a motion responsive member actuated by the resultant motion of said expansible elements and movable thereby in accordance with a selected reset rate, motion transmitting mechanism operatively connecting said first valve with said first element and said motion responsive member, motion transmitting mechanism operatively connecting said second valve with said second element and said motion responsive member, a proportioning band adjustment mechanism associated with each of said motion transmitting mechanisms to provide independent proportioning band adjustments combined with a common selected reset rate, and regulating means actuated by changes in fluid pressure in the system for varying the value of said manipulated variable.

3. In apparatus for controlling predetermined limit values in a series of mutually dependent variables by regulating a manipulated variable, a control mechanism having a fluid pressure system and comprising first and second valves each connected with said system and communicating with a source of fluid pressure for varying the pressure in the system, a first element responsive to changes in value in a first of said mutually dependent variables and a second element responsive to changes in value in a second of said mutually dependent variables, a proportioning-reset device including a first expansible member directly responsive to a pressure change in said system having a movement effective in a selected sense in response to said pressure change, a second expansible member responsive to a pressure change in said system through a restriction and having a movement effective in the opposite sense in response to said pressure change, and a motion responsive member actuated by the resultant movement of said expansible members and movable thereby in accordance with a selected reset rate, means jointly actuated by said first element and said motion responsive member for operating said first valve to vary the pressure in the system when the value of said first mutually dependent variable falls below a selected index setting, means jointly actuated by said second element and said motion responsive member for operating said second valve to vary the pressure in the system when the value of said second mutually dependent variable exceeds a selected index setting, and regulating means actuated by changes in fluid pressure in the system for varying the value of said manipulated variable.

4. In apparatus for controlling predetermined limit values in a series of mutually dependent variables by regulating a manipulated variable, a control mechanism having a fluid pressure system and comprising, first and second valves each connected with said system and communicating with a source of fluid pressure for varying the pressure in the system, a first element responsive to changes in value in a first of said mutually dependent variables and a second element responsive to changes in value in a second of said mutually dependent variables, a proportioning-reset device including a first expansible member directly responsive to a pressure change in said system having a movement effective in a selected sense in response to said pressure change, a second expansible member responsive to a pressure change in said system through a restriction and having a movement effective in the opposite sense in response to said pressure change, and a motion responsive member actuated by the resultant movement of said expansible members and movable thereby in accordance with a selected reset rate, means jointly actuated by said first element and said motion responsive member for operating said first valve to reduce the pressure in the system when the value of said first mutually dependent variable falls below a selected index setting, means jointly actuated by said second element and said motion responsive member for operating said second valve to reduce the pressure in the system when the value of said second mutually dependent variable exceeds a selected index setting, and regulating means actuated by reductions in fluid pressure in the system for varying the value of said manipulated variable in proportional relation to said reductions in fluid pressure.

5. In apparatus for controlling predetermined limit values in a series of mutually dependent variables by regulating a manipulated variable, a control mechanism having a fluid pressure system and comprising, first and second valves each connected with said system and communicating with a source of fluid pressure for varying pressure in the system, a first element responsive to changes in value in a first mutually dependent variable, a second element responsive to changes in value in a second mutually dependent variable, a proportioning-reset device including a first expansible member directly responsive to a pressure change in said system having a movement effective in a selected sense in response to said pressure change, a second expansible member responsive to a pressure change in said system through a restriction and having a movement effective in the opposite sense in response to said pressure change, and a motion responsive member actuated by the resultant movement of said expansible members and movable thereby in accordance with a selected reset rate, first and second gimbal systems each comprising a support, a first gimbal pivotally mounted on the support and a second gimbal pivotally mounted on the first gimbal, the axes of said pivotal mountings intersecting, means for rotating one of the gimbals in said first gimbal system by said first element, means for rotating one of the gimbals in said second gimbal system by said second element, means for rotating the other of said gimbals in each of said gimbal systems by said motion responsive member, means disposed in spaced relation with the intersection of said axes operatively connecting said second gimbal in said first system with said first valve and operatively connecting said second gimbal in said second system with said second valve, said last mentioned means being adjustable substantially about the said intersection to vary the effective action of said gimbals, and regulating means actuated by changes in fluid pressure in the system for varying the value of said manipulated variable.

6. In apparatus for controlling predetermined limit values in a series of mutually dependent variables by regulating a manipulated variable, a control mechanism having a fluid pressure system and comprising, first and second valves each connected with said system and communicating with a source of fluid pressure for varying the pressure in the system, a first element responsive to changes in value in a first mutually dependent variable, a second element responsive to changes in value in a second mutually dependent variable, a proportioning-reset device including a first expansible member directly responsive to a pressure change in said system having a movement effective in a selected sense in response to said pressure change, a second expansible member responsive to a pressure change in said system through a restriction and having a movement effective in the opposite sense in response to said pressure change, and a motion responsive member actuated by the resultant movement of said expansible members and movable thereby in accordance with a selected reset rate, first and second gimbal systems each comprising a support, a first gimbal pivotally mounted on the support and a second gimbal pivotally mounted on the first gimbal, the axes of said pivotal mountings intersecting, a first means for rotating one of the gimbals in said first gimbal system by said first element, a second means for rotating one of the gimbals in said second gimbal system by said second element, a third means for rotating the other of said gimbals in each of said gimbal systems by the motion responsive member of said proportioning-reset device, said first and third means varying the pressure in said system when the value of said first manually dependent variable drops below a selected index setting, and said second and third means varying the pressure in said system when the value of said second mutually dependent variable exceeds a selected index setting, a fourth means disposed in spaced relation with the intersection of the gimbal axes operatively connecting said second gimbal in said first system with said first valve, and a fifth means disposed in spaced relation with the intersection of the gimbal axes operatively connecting said second gimbal in said second system with said second valve, said fourth means and fifth means being adjustable substantially about the said intersection to vary the effective action of said gimbals, and regulating means actuated by changes in fluid pressure in the system for varying the value of said manipulated variable.

7. In apparatus for controlling predetermined limit values in a series of mutually dependent variables by governing regulating means responsive to changes in pressure in a fluid pressure system for varying the value of a manipulated variable, pneumatic relay mechanism, comprising, first and second valves connected with said system each communicating with a source of fluid pressure for varying the pressure in the system, a first motion transmitting mechanism in operative connection with said first valve, a second motion transmitting mechanism in operative connection with said second valve, a first element responsive to changes in value in a first mutually dependent variable imparting movements to said first motion transmitting mechanism in response to said changes, a second element responsive to changes in value in a second mutually dependent variable imparting movements to said second motion transmitting mechanism in response to said changes, a proportioning-reset device including a first expansible member directly responsive to a pressure change in said system having a movement effective in a selected sense in response to said pressure change, a second expansible member responsive to a pressure change in said system through a restriction and having a movement effective in the opposite sense in response to said pressure change, and a motion responsive member operatively connecting the resultant movement of said expansible members with each motion transmitting mechanism, the resultant movement of said expansible members imparting movements to each motion-transmitting mechanism in accordance with a selected reset rate, and an independent proportioning band adjustment associated with each of said motion transmitting mechanisms for varying the movements imparted to said first valve and to said second valve to provide independent proportioning band settings combined with a common reset rate.

References Cited in the file of this patent

UNITED STATES PATENTS

| | | |
|---|---|---|
| 2,296,714 | Ibbott | Sept. 22, 1942 |
| 2,399,938 | Pett | May 7, 1946 |
| 2,570,152 | Pett | Oct. 2, 1951 |
| 2,585,347 | Robins | Feb. 12, 1952 |
| 2,606,445 | Eckman | Aug. 12, 1952 |

FOREIGN PATENTS

| | | |
|---|---|---|
| 39,123 | Norway | June 23, 1924 |
| 519,684 | Germany | Mar. 3, 1931 |